United States Patent
Jain

(10) Patent No.: US 9,261,710 B2
(45) Date of Patent: Feb. 16, 2016

(54) 2D QUALITY ENHANCER IN POLARIZED 3D SYSTEMS FOR 2D-3D CO-EXISTENCE

(75) Inventor: Sunil K. Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 12/973,561

(22) Filed: Dec. 20, 2010

(65) Prior Publication Data

US 2012/0002279 A1 Jan. 5, 2012

Related U.S. Application Data

(60) Provisional application No. 61/350,297, filed on Jun. 1, 2010.

(51) Int. Cl.
*H04N 7/18* (2006.01)
*G02B 27/28* (2006.01)
*H04N 13/04* (2006.01)

(52) U.S. Cl.
CPC .......... *G02B 27/286* (2013.01); *H04N 13/0434* (2013.01); *H04N 13/0456* (2013.01)

(58) Field of Classification Search
CPC .......... H04N 13/0497; H04N 13/0404; H04N 13/0409
USPC ..................................... 348/30–60
See application file for complete search history.

(56) References Cited

U.S. PATENT DOCUMENTS

| | | | |
|---|---|---|---|
| 6,157,351 A * | 12/2000 | Olson | 345/7 |
| 6,157,424 A | 12/2000 | Eichenlaub | |
| 7,086,735 B1 * | 8/2006 | Provitola | 353/10 |
| 7,522,184 B2 * | 4/2009 | Sun | 348/53 |
| 7,573,475 B2 * | 8/2009 | Sullivan et al. | 345/427 |
| 8,274,557 B2 * | 9/2012 | Tomita | 348/54 |
| 2006/0139448 A1 * | 6/2006 | Ha et al. | 348/51 |
| 2008/0252639 A1 * | 10/2008 | Ijzerman et al. | 345/419 |
| 2010/0103318 A1 * | 4/2010 | Wang et al. | 348/565 |
| 2010/0123773 A1 | 5/2010 | Tomita | |
| 2011/0096155 A1 * | 4/2011 | Choo et al. | 348/58 |

(Continued)

FOREIGN PATENT DOCUMENTS

| | | |
|---|---|---|
| EP | 1932368 B1 | 6/2009 |
| EP | 2315450 A2 | 4/2011 |

(Continued)

OTHER PUBLICATIONS

International Search Report and Written Opinion for PCT Patent Application No. PCT/US2011/037113, mailed on Jan. 18, 2012, 8 pages.

(Continued)

*Primary Examiner* — Andy Rao
(74) *Attorney, Agent, or Firm* — International IP Law Group, P.L.L.C.

(57) ABSTRACT

Polarized 3D viewing systems inherently cut the viewing resolution in half. While 3D content looks of good quality, the quality of any co-existing 2D content in windowed mode on the same screen looks poor. Embodiments may be directed to modifying the 2D content in real time and presents the enhanced 2D content (i.e. 2D+) to each eye as if it was 3D content targeted at each of the left and right eyes separately. The 2D+ content quality thus appears much better than when viewing the original 2D content on a polarized screen through polarized eyewear.

17 Claims, 2 Drawing Sheets

(56) References Cited

U.S. PATENT DOCUMENTS

| | | |
|---|---|---|
| 2011/0169831 A1 | 7/2011 | Kao et al. |
| 2011/0242288 A1* | 10/2011 | Francisco .................. 348/51 |

FOREIGN PATENT DOCUMENTS

| | | |
|---|---|---|
| JP | 10-232665 | 2/1998 |
| JP | 10186277 A | 7/1998 |
| JP | 10224825 A | 8/1998 |
| JP | 2005-354437 | 12/2005 |
| KR | 10-0754192 B1 | 8/2007 |
| KR | 10-2008-0037261 A | 4/2008 |
| KR | 100953357 B1 | 4/2010 |
| KR | 1020100052991 A | 5/2010 |
| TW | 201018228 A | 5/2010 |
| WO | 2011/152998 A2 | 12/2011 |
| WO | 2011/152998 A3 | 3/2012 |

OTHER PUBLICATIONS

Office Action received for Korean Patent Application No. 2011-0052300, mailed on Oct. 15, 2012, 3 pages of English Translation.

Combined Search and Examination Report received for United Kingdom Patent Application No. GB1107740.1, mailed on Aug. 8, 2011, 7 pages.

International Preliminary Report on Patentability and Written Opinion received for International Patent Application No. PCT/US2011/037113, mailed on Dec. 13, 2012, 5 pages.

Office Action received for Japanese Patent Application No. 2011-112175, mailed on Jan. 29, 2013, 3 pages of Office Action and 4 pages of English Translation.

Office Action received for Korean Patent Application No. 2011-0052300, mailed on Apr. 29, 2013, 3 pages of English Translation only.

Office Action received for Chinese Patent Application No. 201110144072.X, mailed on May 20, 2013, 22 pages of office action including 13 pages of English translation.

Office Action received for Chinese Patent Application No. 201110144072.X, mailed on Nov. 28, 2013, 7 Pages of Office Action including 4 pages of English translation.

Office Action received for Japanese Patent Application No. 2011-112175, mailed on Nov. 5, 2013, 3 pages of Office Action Including 2 page of English Translation.

* cited by examiner

2D QUALITY ENHANCER IN POLARIZED 3D SYSTEMS FOR 2D-3D CO-EXISTENCE

CROSS-REFERENCE TO RELATED APPLICATIONS

This application claims priority to U.S. Provisional Application Ser. No. 61/350,297, filed on Jun. 1, 2010, the contents of which are herein incorporated by reference.

FIELD OF THE INVENTION

Embodiments of the present invention are directed to stereoscopic systems and, more particularly, to eyewear systems useful for simultaneous two dimensional (2D) and three-dimensional (3D) viewing.

BACKGROUND INFORMATION

Humans have what is known as binocular vision owing to the fact that we have two eyes separated by a couple of inches. Each eye views the same scene from a slightly different perspective view each providing the brain with slightly different information. These two views are combined by the brain such that we perceive depth and see the world in three-dimensions (3D).

Electronically stored or transmitted visual images, such as pictures or video, is typically displayed on a two dimensional medium such as a television screen or other type of monitor or projected on to a screen. Both eyes view the same information. The brain is thus left to use other visual cues from the two-dimensional (2D) image, such as relative sizes of objects, shadow, perspective lines, or horizons, to name a few, to sense depth. However, the picture still looks flat and not like we see the real world.

Stereoscopy refers to any of various processes and devices for giving the illusion of depth from two-dimensional images. We say illusion because true 3D may be more like a hologram where you could walk around the image and change your perspective. However, when done correctly, stereoscopy can trick the brain into thinking objects are jumping out of the screen at you.

In its simplest form, two cameras, or one camera with two lenses, spaced a few inches apart, are used to capture two 2D images. Each 2D image, of course, is from a slightly different perspective such that when the left eye views one image and the right eye views the other, the brain combines the views and we see the combined image as three-dimensional (3D).

Big screen stereoscopic motion pictures or "3D movies", as is the term more commonly used, are becoming quite popular again. In addition, 3D technologies are now available for home video with the so-called 3D TVs, video games, and streaming and recorded video content for computer monitor viewing.

There are several types of stereoscopic or "3D" technology available. Most require the viewer to wear special glasses or goggles. Some require active components in the glasses, others do not. Some require special monitors or drivers. Each has it pros and cons and, depending on the situation, may or may not make sense for a specific task.

Regardless of the technology used, the end goal is primarily to separate what the left and the right eye sees. Early technologies involved physical separation where a viewer looked into a binocular-like device, with a lens for each eye to physically separate the left and right views. This technique which may be the oldest, works quite well and a close variation of this technique is still used in modern virtual reality goggles or head-mounted displays. However, this is only good for one person or individual viewing and may be expensive or impractical for more than a couple viewers.

One of the first left/right (L/R) separation technologies good for the masses was spectral separation. The technical term is "color anaglyph" and involved each viewer wearing a pair of glasses with a red filter for one eye and a blue filter for the other. The left and right images were likewise blue or red encoded and displayed simultaneously. This technique was popular for producing 3D movies in the 1950s and even works to some degree with standard color televisions or monitors. While providing a novelty for its day, it left much to be desired aesthetically. The end result tended to be monochromatic, and had a lot of ghosting (i.e. the L/R separation was not clean). On the pro side, it was inexpensive to produce and the glasses were passive and very inexpensive.

Similar to spectral separation, the next most common technique is spatial separation and involves the viewers wearing polarized glasses, with each eye lens being polarized at 45 degrees, for example, to the other or circularly polarized in opposite directions. This is the technology used most often today in movie theaters. It works pretty well with the L/R separation being fairly complete, but usually requires two projectors or a special projector in a theatre setting or a few additional layers in a monitor which adds cost. Also, each eye only sees half resolution which may degrade the viewing experience. On the pro side, the polarized glasses are again passive and therefore relatively inexpensive.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Polarized 3D viewing systems inherently cut the viewing resolution in half. While 3D content looks of good quality while wearing polarized glasses, the quality of any co-existing 2D content in windowed mode on the same screen looks poor. This is especially the case in personal computing scenarios if the 2D content is text.

Figure 1:
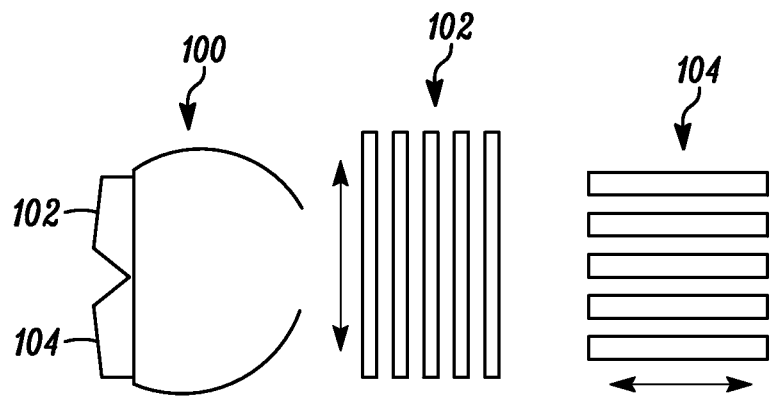
FIG. 1 is pair of polarized glasses for viewing a 3D polarized display.
Figure 2:
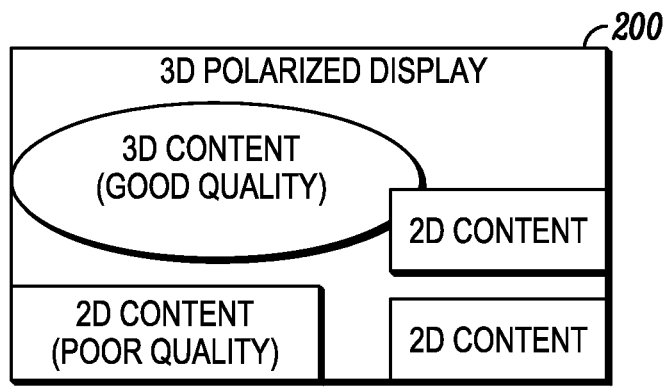
FIG. 2 is a 3D polarized display having multiple windows open at once, some having traditional 2D content and some having 3D content.

FIG. 1 illustrates a pair of polarized glasses 100 for viewing a 3D polarized display. As shown, the glasses 100 have a right eye lens 102 polarized in one direction and a left eye lens 104 polarized in another direction. FIG. 2 shows a 3D polarized display 200 which one may view with the glasses 100 of FIG. 1. The display may have multiple windows open at once, some having traditional 2D content and some having 3D content. A common usage scenario on a polarized 3D PC display 200 could be that the user wearing polarized glasses 100 is watching a 3D video in one window, while working on emails in another window, chatting in another window, and editing word document to take notes from the 3D video being watched in yet another window. As conceptually illustrated in FIG. 2 if wearing the glasses 100 the quality of viewing will be poor for the 2D content while the quality of the 3D in another window is good/acceptable.

Embodiments of the invention solves the problem of half resolution of the 2D content by reformatting in such a way that 2D content appears full resolution to the user eyes, while co-existing with the 3D content on the same polarized screen. Hereinafter this reformatting may be referred to as 2D+.

Figure 3:
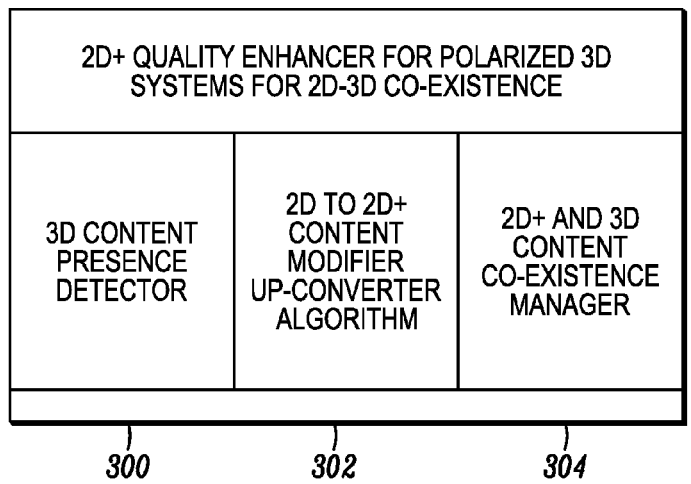
FIG. 3 is a diagram showing the modules for realizing a 2D+ quality enhanced polarized 3D system where 2D and 3D content are simultaneously displayed.

Referring now to FIG. 3, there is illustrated the modules for realizing 2D+ a quality enhanced polarized 3D system where 2D and 3D content are simultaneously displayed. In one embodiment, the system may comprise a 3D content presence detector 300, a 2D to 2D+ content up-modifier 302 and a 2D+ and 3D content co-existence manager 304.

Figure 4:
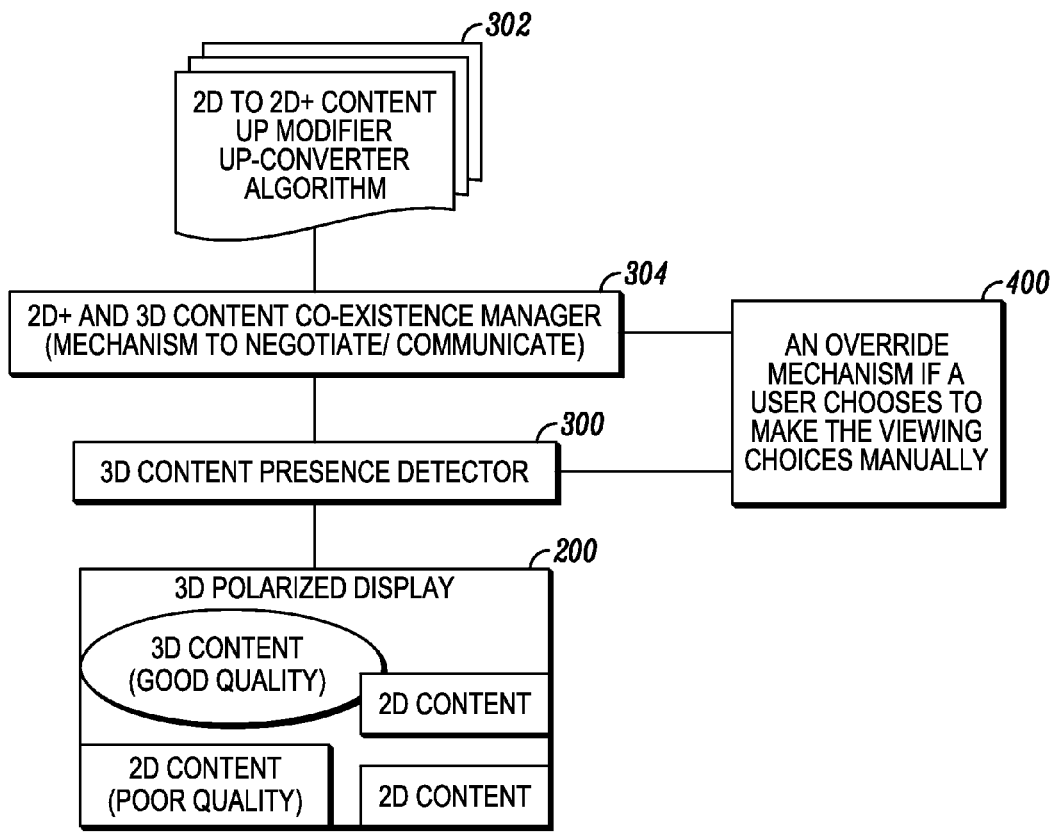
FIG. 4 illustrates a system for 2D+ quality enhancement for polarized 3D displays with 2D and 3D media co-existing.

FIG. 4 illustrates a system for 2D+ quality enhancement for polarized 3D displays with 2D and 3D media co-existing. The system may run, for example on a PC or any other suitable computing platform. As shown, a display 200 may comprise a number of windows; some having 2D content and some having 3D content. The invention first automatically detects the presence of a 3D content on the screen with the 3D content presence detector 300. By default this invention assumes that the user is using a 3D viewing system that optically cuts the resolution of the content in half, however an override control 400 may be provided so that user can for any reason choose to disable the enhancement features and view the original 2D content.

Next, implementation 2D to 2D+ conversion algorithms are applied via the 2D to 2D+ content modifier 302. In case of personal computing devices, overlay composition architecture easily allows the 2D frames to be modified and displayed. For example, one method for converting from 2D to 2D+ frames may be by adding a spatial disparity of, for example, one or more pixels in X or Y direction, and then present the original and the modified frames as two separate frames to the left and right eye. Another example may be by adding a miniscule wavelength disparity to pixel color, and present the two separate frames to the left and right eyes. A third component of this invention is the 2D+ and 3D content co-existence manager 304 which may control the execution of conversion algorithms 302, content presence detector 300 and introduction of any visual artifacts.

Thus, embodiments may be directed to software or hardware or combinations that modifies the 2D content in real time and presents the enhanced 2D content (i.e. 2D+) to each eye as if it was 3D content targeted at each of the left and right eyes separately. The 2D+ content quality thus appears much better than when viewing the original 2D content on a polarized screen through polarized eyewear.

Embodiments may be embedded as a middleware (such as direct show filter in windows), or a graphics driver extension or an application or a combination of some or all of the above. This invention can also be implemented as a hardware mechanism in the display device itself, such as in embedded display in PC, monitor, TV, or projector.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a polarized display to display at least one window with 2D content and at least one window with 3D content; and
    a content modifier to modify the 2D content to produce 2D+ content for a right eye frame or a left eye frame presented on the display, wherein the 2D+ content appears at a higher resolution than the 2D content when viewed through polarized lenses, and the 2D+ content and the 3D content are simultaneously displayed.

2. The apparatus as recited in claim 1 wherein the content modifier adds a spatial disparity of one or more pixels in an X or Y direction to one of the right eye frame or the left eye frame.

3. The apparatus as recited in claim 1 wherein the content modifier adds a wavelength disparity to pixel color to one of the right eye frame or left eye frame.

4. The apparatus as recited in claim 1 further comprising a content co-existence manager to manage the at least one window with 2D content and at least one window with 3D content.

5. The apparatus as recited in claim 1 further comprising an override to allow a user to disable the content modifier.

6. A method, comprising:
    displaying on a polarized display at least one window with 2D content and at least one window with 3D content; and
    modifying the 2D content to produce 2D+ content for a right eye frame or a left eye frame presented on the display, wherein the 2D+ content appears at a higher resolution than the 2D content when viewed through polarized lenses, and the 2D+ content and the 3D content are simultaneously displayed.

7. The method as recited in claim 6 wherein the modifying comprises adding a spatial disparity of one or more pixels in an X or Y direction to one of the right eye frame or the left eye frame.

8. The method as recited in claim 6 wherein the modifying comprises adding a wavelength disparity to pixel color to one of the right eye frame or left eye frame.

9. The method as recited in claim 6 further comprising managing co-existence of the at least one window with 2D content and at least one window with 3D content.

10. The method as recited in claim 6 further comprising providing an override to allow a user to disable the modifying.

11. The method as recited in claim 6 further comprising viewing the display with polarized eyewear.

12. The method as recited in claim 6 further comprising detecting presence of 3D content.

13. A system, comprising:
a computer device;
a polarized display connected to the computer device to display at least one window with 2D content and at least one window with 3D content;
a content modifier to modify the 2D content to produce 2D+ content for a right eye frame or a left eye frame presented on the display, wherein the 2D+ content appears at a higher resolution than the 2D content when viewed through polarized eyewear, and the 2D+ content and the 3D content are simultaneously displayed; and
the polarized eyewear for viewing the polarized display.

14. The system as recited in claim 13 wherein the content modifier adds a spatial disparity of one or more pixels in an X or Y direction to one of the right eye frame or the left eye frame.

15. The system as recited in claim 13 wherein the content modifier adds a wavelength disparity to pixel color to one of the right eye frame or left eye frame.

16. The system as recited in claim 13 further comprising a content co-existence manager to manage the at least one window with 2D content and at least one window with 3D content.

17. The system as recited in claim 13 further comprising an override to allow a user to disable the content modifier.

* * * * *